United States Patent

Dage

[11] Patent Number: 5,833,133
[45] Date of Patent: Nov. 10, 1998

[54] MICROPROCESSOR-CONTROLLED SEMI-AUTOMATIC TEMPERATURE CONTROL DEVICE

[75] Inventor: Gerhard Allan Dage, Franklin, Mich.

[73] Assignee: Ford Motor Company, Dearborn, Mich.

[21] Appl. No.: 869,355

[22] Filed: Jun. 5, 1997

[51] Int. Cl.⁶ ............................... F23L 17/16; B60H 3/00
[52] U.S. Cl. .............................. 236/13; 62/161; 165/204; 454/43
[58] Field of Search ................................. 62/161; 236/13, 236/49.3; 165/11.1, 204, 43; 454/75

[56] References Cited

U.S. PATENT DOCUMENTS 5,549,152  8/1996  Davis, Jr. et al. ................ 165/43 X
5,590,540  1/1997  Ikeda et al. ........................ 62/161 X
5,699,857  12/1997  Flaishans et al. ................... 165/202

*Primary Examiner*—William Wayner
*Attorney, Agent, or Firm*—Paul K. Godwin; Roger L. May

[57] ABSTRACT

A semi-automatic temperature control (SATC) device for controlling a heating, ventilation and air conditioning (HVAC) system includes a microprocessor operative to receive a plurality of inputs, and control air discharge temperature and blower speed based on the plurality of inputs. The SATC device further includes a switch for controlling the direction of air flow in the cabin of an automotive vehicle independent of the control provided by the microprocessor.

12 Claims, 3 Drawing Sheets

MICROPROCESSOR-CONTROLLED SEMI-AUTOMATIC TEMPERATURE CONTROL DEVICE

TECHNICAL FIELD

This invention relates to low cost, microprocessor-controlled semi-automatic temperature control devices.

BACKGROUND ART

A fundamental goal of automotive heating, ventilating, and air conditioning (HVAC) systems is to make vehicle occupants comfortable. To achieve this goal, it is important that the design of the control system that establishes cabin conditions takes into account the relationship between comfort and the variables that affect comfort. Human comfort is a complex reaction, involving physical, biological, and psychological responses to the given conditions. Because of this complexity, the engineer must consider many variables and their possible interaction in the design strategy of such a control system or controller.

Typically, a controller designed to control such a system is a fully automatic Electronic Automatic Temperature Control (EATC) that controls air discharge (or air temperature), blower speed, and mode shift. An EATC is typically expensive due to an electronic display and pushbuttons requiring digital inputs for memory retention. Because the EATC is rather expensive, it is usually offered only on high end automobiles.

Thus, there exists a need for a low-cost temperature controller that provides many of the features available with an EATC.

DISCLOSURE OF THE INVENTION

It is thus a general object of the present invention to provide an inexpensive micro-processor controlled semi-automatic temperature control (SATC) device for controlling a heating, ventilation and air conditioning system of an automotive vehicle.

In carrying out the above object and other objects, features, and advantages of the present invention, the SATC device includes a microprocessor operative to receive a plurality of inputs, and control air discharge temperature and blower speed based on the plurality of inputs. The SATC device further includes a switch for controlling the direction of air flow in the cabin of the vehicle independent of the control provided by the microprocessor.

The above object and other objects, features and advantages of the present invention are readily apparent from the following detailed description of the best mode for carrying out the invention when taken in connection with the accompanying drawings.

BEST MODES FOR CARRYING OUT THE INVENTION

Figure 1:
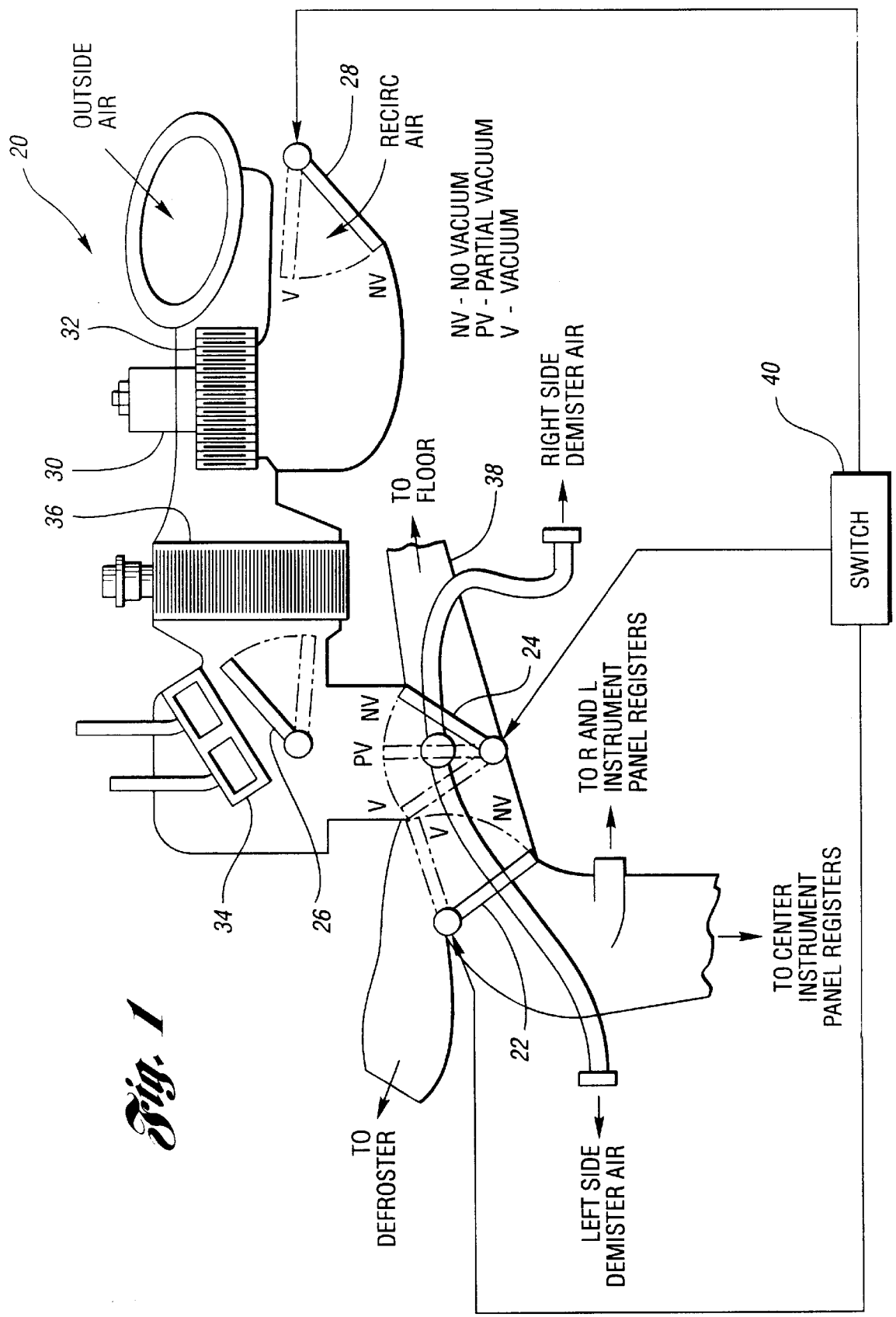
FIG. 1 is a schematic diagram illustrating an air handling system which can be controlled by the device of the present invention.

In general, control of temperature within an automobile is accomplished using various actuators to adjust the temperature and flow of air supplied to the cabin of the vehicle. FIG. 1 shows schematically an air handling system of an HVAC (heating, ventilation and air conditioning) system, generally indicated at 20. The system 20 includes the arrangement of panel-defrost, floor-panel, temperature blend and outside recirc air actuators or doors 22, 24, 26 and 28, respectively. The doors 22, 24 and 28 are driven by vacuum motors and/or electric motors (not shown) between their various positions, such as vacuum, partial vacuum and no vacuum positions, in a conventional fashion as indicated in FIG. 1 via a manually operable switch 40. The door 26 is driven by an electric actuator also in a conventional fashion.

The system 20 also includes a variable speed blower motor or fan 30 including a blower wheel 32.

The system further includes heating and cooling elements such as a heater core 34 and an evaporator core 36 in a typical vehicle air conditioning plant. Each of the above components is in communication with ducting 38 in order to control temperature, the direction of air flow and the ratio of fresh air to recirculated air.

Figure 2:
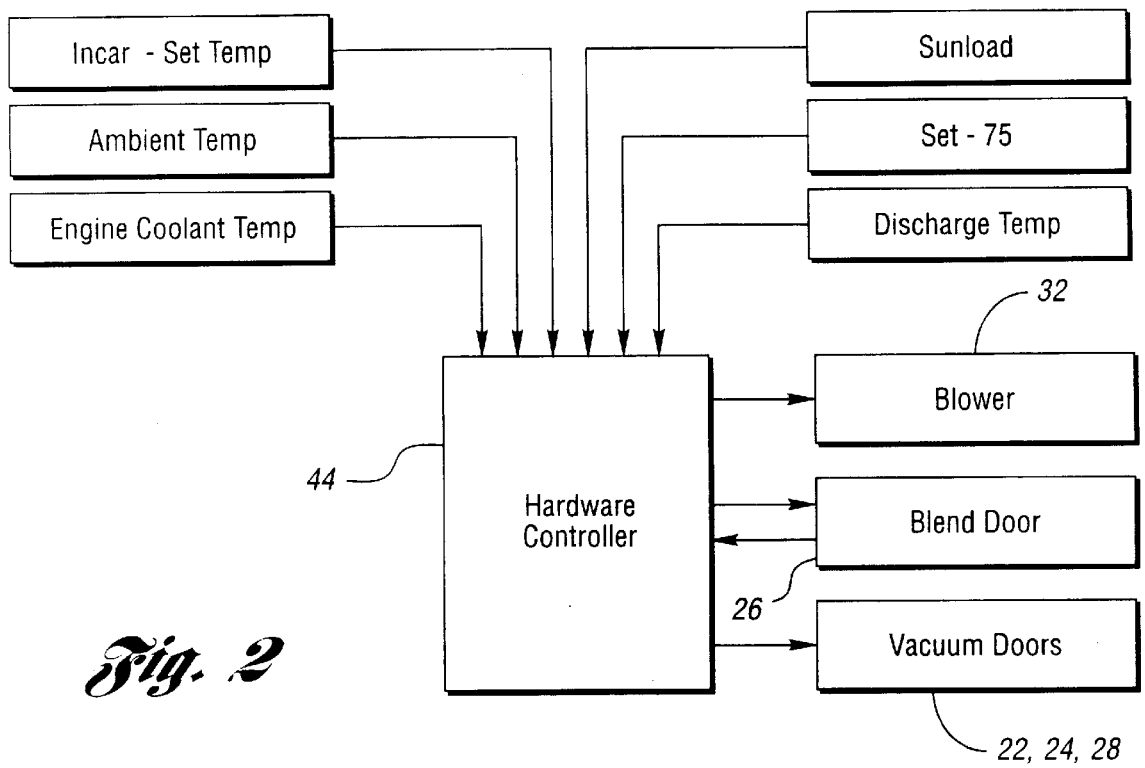
FIG. 2 is a schematic block diagram of the control system of the present invention.

For automatic control of the temperature and flow of air in the cabin, conditions within and outside the cabin are monitored by sensors and an electronic controller generates signals to control the plant actuators according to the conditions as indicated by the sensors. As illustrated in FIG. 2, a typical complement of sensors of the HVAC system provide signals which are representative of in-car temperature, ambient (outside) air temperature, engine coolant temperature (ECT), discharge air temperature and sunload. In addition, there is a set signal or set temperature value indicating the desired temperature that is set manually by the driver. In turn, an incar-set temperature (in-car minus set temperature) signal and a set–75 (set temperature minus 75 degrees Fahrenheit) signal are generated or calculated.

The signals are provided to a hardware controller 44 as inputs. Hardware controller 44, in turn, controls the doors 22 through 28 to regulate the temperature and flow of air and ultimately to maintain the comfort of driver and passengers in the vehicle.

Figure 3:
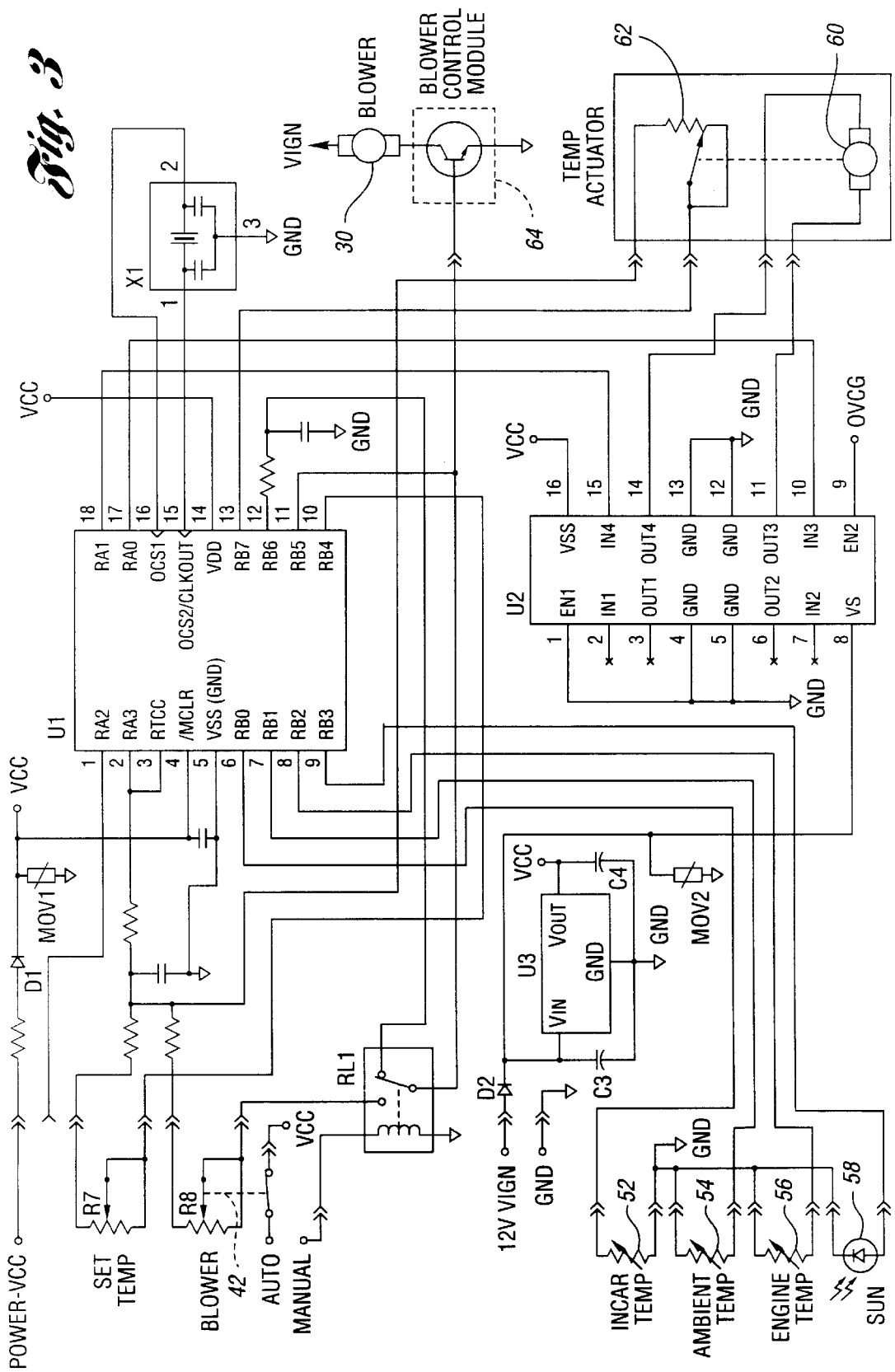
FIG. 3 is a circuit diagram of the device of the present invention.

Turning now to FIG. 3, there is shown a circuit diagram of the SATC device of the present invention. The SATC device includes a programmable microprocessor U1 having a plurality of inputs and outputs. Microprocessor U1 receives inputs from a plurality of sensors, including, but not limited to, an incar temperature sensor 52 for sensing the interior temperature of the vehicle, an ambient temperature sensor 54 for sensing outside temperature, an engine coolant temperature (ECT) sensor 56 for sensing a temperature of the engine, and a sunload sensor 58 for sensing the effects of the sun on the interior vehicle temperature.

Microprocessor U1 also receives a setpoint temperature representative of the occupant's desired interior temperature. The setpoint temperature is inputted from a temperature potentiometer R7 accessible to the occupant on the SATC device itself. Potentiometer R7 is preferably 50 Kohm.

Microprocessor U1 further receives a blower speed input from a blower speed potentiometer R8, preferably 50 Kohm, if the occupant selects manual control of blower speed. Automatic control of blower speed by microprocessor U1 is selected via toggle switch 42, which is also connected to blower speed potentiometer R8. Also coupled to blower speed potentiometer R8 is a relay RL1 for directing the automatic blower control output signal initiated via toggle switch 42 to a blower control module 64, which drives the blower motor 30.

Figure 4:
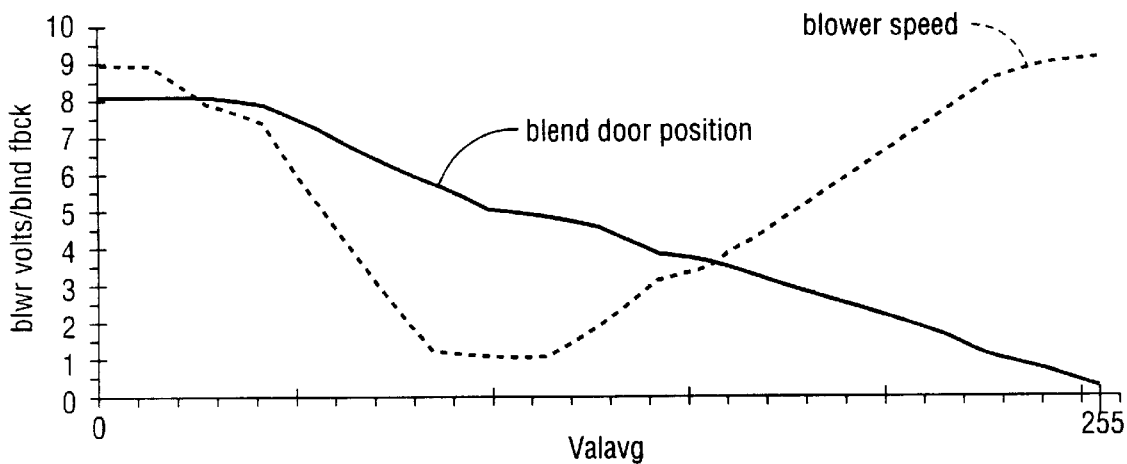
FIG. 4 is a graphical representation of the transfer function programmed into the microprocessor of the present invention.

Microprocessor U1 controls the air discharge temperature and blower speed based on the above described inputs. First, the air discharge temperature is determined based on a predetermined mathematical representation to provide a predetermined output transfer function, as shown in FIG. 4. The output transfer function shown in FIG. 4 illustrates the desired blend door position (air discharge temperature) and blower speed for specific in-car temperatures based on customer-related data. That is, the desired blend door position and blower speed were obtained after analyzing data identifying a customer's comfort rating at each of the in-car temperatures.

Thus, the air discharge temperature (or blend door position) is controlled according to the following equation:

$$VALAVG = OFFSET - K1*(SUNCOMP) + K2*(Tset-75) + K3*(75-Tamb) + K4*(Tset-Tcar),$$

where,

VALAVG is a number from 0 to 255 representing the position of the blend door wherein 0 equals no travel (maximum cooling) and 255 equals complete travel (maximum heating);

OFFSET is the manually calculated blend door position that will produce a 75 degree Fahrenheit discharge temperature when the set temperature is 75 degrees Fahrenheit and the ambient temperature is 75 degrees Fahrenheit, preferably 125;

SUNCOMP is the inverse of the reading of the sunload sensor wherein if the sunload sensor reading equals 0 (maximum brightness), there is maximum subtraction from VALAVG, and wherein if the sunload sensor reading equals 255 (maximum darkness), there is no subtraction from VALAVG;

Tset is the desired temperature in the vehicle that is set by the occupant;

Tamb is the outside temperature;

Tcar is the interior temperature of the vehicle; and

K1, K2, K3 and K4 are empirically determined constants.

Since there is an essentially linear relationship between blend door position and Tcar (i.e., the interior temperature of the vehicle), the blend door position is set equal to VALAVG.

Upon determining the position of blend door 26, microprocessor commands the actuator 60 accordingly via driver U2. At the same time, the position of blend door 26 is fed back to microprocessor U1 via feedback resistor 62 for use in determining the desired blower speed. The blower speed is divided into two halves: Cooling when VALAVG $\leq$ OFFSET, and Heating when VALAVG $\geq$ OFFSET. For Cooling, the equation is:

$$\text{Blower Speed (in HEX or DECIMAL counts)} = [(OFFSET-VALAVG-CSTART)*CSLOPE] + AUTMIN,$$

where,

CSTART is the count for VALAVG below which the blower speed will begin ramping up from its minimum value to its maximum value;

CSLOPE is the slope at which the blower speed will ramp up; and

AUTMIN is the minimum blower speed.

For Heating, the blower speed is determined according to the following:

$$\text{Blower Speed (in HEX or DECIMAL counts)} = [(VALAVG-OFFSET-HSTART)*HSLOPE] + AUTMIN,$$

where,

HSTART is the count for VALAVG above which the blower speed will begin ramping up from its minimum value to its maximum value, and HSLOPE is the slope at which the blower speed will ramp up.

Upon determining the desired blower speed, microprocessor U1 sends an appropriate signal to blower control module 64, which converts the low voltage signal into a high voltage signal. Blower control module 64 then drives blower motor 30 accordingly.

The SATC device further includes a 4.0 MHz clock crystal X1 for providing a clock speed and a voltage regulator U3 for supplying voltage to microprocessor U1 and driver U2.

Figure 5:
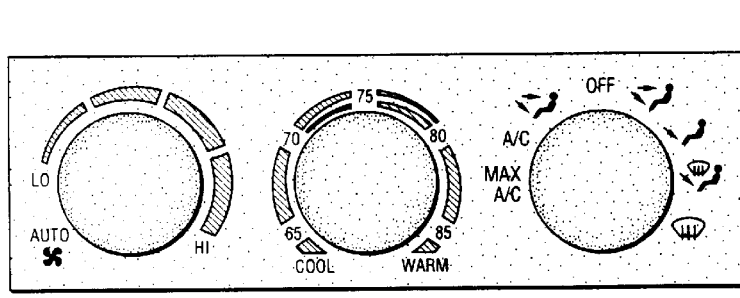
FIG. 5 is a front view of a front panel overlay for the SATC device of the present invention.

Turning now to FIG. 5, there is shown a front view of a front panel overlay on the SATC device of the present invention. At the left side of the SATC device, denoted generally by reference numeral 50, is the blower speed selection portion. A rotary knob (not shown) mounted onto potentiometer R8 is rotated to select either automatic control of the blower speed or a desired blower speed.

In the center of the SATC device 50 is the temperature selection portion. A rotary knob (not shown) mounted onto potentiometer R7 is rotated to select the desired temperature inside the vehicle.

The right side of SATC device 50 is the mode (or air flow direction) portion, which is manually selected via another rotary knob (not shown) mounted onto switch 40. Thus, switch 40 controls the direction of air flow independent of the control provided by microprocessor U1.

The device of the present invention provides several advantages. Due to the simplicity of the design, a small, low-cost microprocessor can be utilized. In addition, a less expensive graphical applique is used in place of a traditional digital display. Less expensive rotary knobs replace the traditional pushbuttons that require digital inputs for memory retention. Thus, the device of the present invention provides semi-automatic temperature control at a cost significantly less than a traditional automatic temperature control device.

While the best modes for carrying out the invention have been described in detail, those familiar with the art to which this invention relates will recognize various alternative designs and embodiments for practicing the invention as defined by the following claims.

What is claimed is:

1. A micro-processor controlled semi-automatic temperature control device having an automatic mode and a manual mode for controlling a heating, ventilation and air conditioning (HVAC) system which discharges a flow of air to a passenger cabin of an automotive vehicle, the HVAC system including a variable speed blower, the device comprising:

a microprocessor operative to receive a plurality of inputs, and control air discharge temperature and blower speed based on the plurality of inputs; and a switch for controlling the direction of air flow in the cabin of the vehicle independent of the control provided by the microprocessor.

2. The device as recited in claim 1 wherein the microprocessor, in receiving a plurality of inputs, is operative to receive an automatic control signal initiating the automatic mode of the HVAC system.

3. The device as recited in claim 2 further comprising a first potentiometer having a switched position and a variable position, the switched position for selecting the automatic mode of the HVAC system and the variable position for selecting the manual mode of the HVAC system.

4. The device as recited in claim 1 wherein the microprocessor, in receiving a plurality of inputs, is further operative to receive an ambient temperature representative of the temperature outside the vehicle, an in-car temperature representative of the temperature inside the vehicle, and a set temperature representative of a desired temperature inside the vehicle.

5. The device as recited in claim 4 wherein the HVAC system includes a blend door for varying air temperature and wherein the microprocessor, in controlling the air discharge temperature, is further operative to control the blend door based on the ambient, in-car and set temperatures.

6. The device as recited in claim 5 wherein the microprocessor, in controlling the blend door, is further operative to determine a position of the blend door according to the following:

$$Valavg = OFFSET - K1*(SUNCOMP) + K2*(Tset-75) + K3*(75-Tamb) + K4*(Tset-Tcar),$$

where,

VALAVG is a number from 0 to 255 representing the position of the blend door wherein 0 equals no travel (maximum cooling) and 255 equals complete travel (maximum heating);

OFFSET is the manually calculated blend door position that will produce a 75 degree Fahrenheit discharge temperature when the set temperature is 75 degrees Fahrenheit and the ambient temperature is 75 degrees Fahrenheit;

SUNCOMP is the inverse of the reading of the sunload sensor wherein if the sunload sensor reading equals 0 (maximum brightness), there is maximum subtraction from VALAVG, and wherein if the sunload sensor reading equals 255 (maximum darkness), there is no subtraction from VALAVG;

Tset is the desired temperature in the vehicle that is set by the occupant;

Tamb is the outside temperature;

Tcar is the interior temperature of the vehicle; and

K1, K2, K3 and K4 are empirically determined constants.

7. The device as recited in claim 6 wherein the microprocessor, in controlling the blower speed, is further operative to determine a speed of the blower based on the position of the blend door.

8. The device as recited in claim 7 wherein the microprocessor, in determining the speed of the blower, is further operative to compare the value VALAVG with the value OFFSET.

9. The device as recited in claim 8 wherein the microprocessor, in determining the speed of the blower, is further operative to determine the speed of the blower when VALAVG$\leq$OFFSET according to the following:

$$\text{Blower Speed (in HEX or DECIMAL counts)} = [(OFFSET-VALAVG-CSTART)*CSLOPE] + AUTMIN,$$

where,

CSTART is the count for VALAVG below which the blower speed will begin ramping up from its minimum value to its maximum value;

CSLOPE is the slope at which the blower speed will ramp up; and

AUTMIN is the minimum blower speed.

10. The device as recited in claim 9 wherein the microprocessor, in determining the speed of the blower, is further operative to determine the speed of the blower when VALAVG$\geq$OFFSET according to the following:

$$\text{Blower Speed (in HEX or DECIMAL counts)} = [(VALAVG-OFFSET-HSTART)]*HSLOPE] + AUTMIN,$$

where,

HSTART is the count for VALAVG above which the blower speed will begin ramping up from its minimum value to its maximum value, and HSLOPE is the slope at which the blower speed will ramp up.

11. The device as recited in claim 1 wherein the switch is a manually operable switch.

12. The device as recited in claim 4 further comprising a second potentiometer for providing the set temperature to the microprocessor.

* * * * *